(12) United States Patent
Cahill et al.

(10) Patent No.: US 9,387,840 B1
(45) Date of Patent: Jul. 12, 2016

(54) MULTI-THREAD EMERGENCY PARK BRAKE SYSTEM

(71) Applicant: Goodrich Corporation, Charlotte, NC (US)

(72) Inventors: Eric Daniel Cahill, Troy, OH (US); Paul R Burte, Clayton, OH (US); David B Stein, Troy, OH (US); Casey Canan, Bradford, OH (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 14/721,636

(22) Filed: May 26, 2015

Related U.S. Application Data (60) Provisional application No. 62/114,754, filed on Feb. 11, 2015.

(51) Int. Cl.
*B60T 8/17* (2006.01)
*B60T 15/02* (2006.01)

(52) U.S. Cl.
CPC ............. *B60T 8/1703* (2013.01); *B60T 15/028* (2013.01)

(58) Field of Classification Search
CPC ............................ B60T 8/1703; B60T 15/028
USPC ............................................ 701/3, 70, 78, 83
See application file for complete search history.

(56) References Cited

U.S. PATENT DOCUMENTS

| 4,008,868 | A | 2/1977 | Berg | |
|---|---|---|---|---|
| 8,641,154 | B2 | 2/2014 | Griffith | |
| 9,216,720 | B2 * | 12/2015 | Cahill | B60T 8/1703 |
| 2005/0192733 | A1 * | 9/2005 | Dellac | B60T 8/00 701/70 |
| 2007/0235267 | A1 | 10/2007 | Liebert | |
| 2008/0133073 | A1 | 6/2008 | Griffith | |
| 2009/0014261 | A1 * | 1/2009 | Edelson | B64C 25/405 188/156 |

* cited by examiner

*Primary Examiner* — Thomas Tarcza
*Assistant Examiner* — Tyler J Lee
(74) *Attorney, Agent, or Firm* — Snell & Wilmer, L.L.P.

(57) ABSTRACT

A brake system is provided. The brake system may comprise a controller, a vehicle management system (VMS), a shut-off valve (SOV), an outboard valve (OBV), an inboard valve (IBV), a control module, an emergency/park power source, and a tangible, non-transitory memory configured to communicate with the controller. The VMS may be in communication with the controller. The control module may be in communication with the SOV, OBV, and IBV. The SOV may be in communication with the controller. The OBV may be in communication with the controller and in fluid communication with the SOV. The IBV may be in communication with the controller and in fluid communication with the SOV. The emergency/park power source may be in fluid communication with the SOV.

20 Claims, 4 Drawing Sheets

MULTI-THREAD EMERGENCY PARK BRAKE SYSTEM

CROSS REFERENCE TO RELATED APPLICATIONS

This application is a nonprovisional application of and claims priority to U.S. Application Ser. No. 62/114,754, entitled "Multi-Thread Emergency Park Brake System," which was filed on Feb. 11, 2015. The aforementioned application is hereby incorporated by reference herein in its entirety.

FIELD

The present disclosure relates to aircraft braking systems, and more specifically, to a system and method for manual control and remote control over emergency braking and park braking of an aircraft.

BACKGROUND

Aircraft brake systems are typically either manual or used in unmanned situations. An aircraft braking system, emergency braking, and park braking typically is controlled mechanically by cable. A lever may be coupled to a cable which may be coupled to a valve in order to supply hydraulic pressure to a braking system.

SUMMARY

A brake system is provided. In various embodiments, the brake system may comprise a controller, a vehicle management system (VMS), a shut-off valve (SOV), an outboard valve (OBV), an inboard valve (IBV), a control module, an emergency/park power source, and a tangible, non-transitory memory configured to communicate with the controller. The VMS may be in communication with the controller. The control module may be in communication with the SOV, OBV, and IBV. The SOV may be in communication with the controller. The OBV may be in communication with the controller and in fluid communication with the SOV. The IBV may be in communication with the controller and in fluid communication with the SOV. The emergency/park power source may be in fluid communication with the SOV.

A redundant emergency/park power source brake system is provided. In various embodiments, the redundant emergency/park power source brake system may comprise a controller, a vehicle management system (VMS), a first control module, a second control module, a first emergency/park power source, a second emergency/park power source, and a tangible, non-transitory memory configured to communicate with the controller. The VMS may be in communication with the controller. The first control module may be in communication with a first shut-off valve (SOV) and an outboard servo valve (OBV). The second control module may be in communication with a second shut-off valve (SOV) and an inboard servo valve (IBV). The first SOV and the second SOV may be in communication with the controller. The OBV may be in communication with the controller and in fluid communication with the first SOV. The IBV may be in communication with the controller and in fluid communication with the second SOV. The first emergency/park power source may be in fluid communication with the first SOV. The second emergency/park power source may be in fluid communication with the second SOV.

A tangible, non-transitory memory is described herein. The tangible, non-transitory memory may be configured to communicate with a controller. The tangible, non-transitory memory may have instructions stored thereon that, in response to execution by the controller, cause the controller to perform operations comprising, sending, by the controller, at least one of a first power signal and a second power signal to a shut-off valve (SOV), wherein in response to at least one of the first power signal or second power signal, the SOV is configured to open, sending, by the controller, a largest of a plurality of signals to an outboard valve (OBV), wherein the plurality of signals comprise at least one of a VMS signal, a park value, and an emergency value, wherein in response to the largest signal being sent to the OBV, the OBV is configured to at least partially open, and sending, by the controller, the largest of a plurality of signals to an inboard valve (IBV), wherein the plurality of signals comprise at least one of the VMS signal, the park value, and the emergency value, wherein in response to the largest signal being sent to the IBV, the IBV is configured to at least partially open.

This architecture supports both manual and automatic (remote controlled) emergency park brake enable and activation while meeting safety and economics/weight issues.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein. Thus, the detailed description herein is presented for purposes of illustration only and not of limitation. The scope of the disclosure is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step.

As used herein, "electronic communication" means communication of electronic signals with physical coupling (e.g., "electrical communication" or "electrically coupled") or without physical coupling and via an electromagnetic field (e.g., "inductive communication" or "inductively coupled" or "inductive coupling").

In various embodiments, aircraft brake systems may include a controller. The controller may be configured to control the force commanded to the braking system. In hydraulic braking systems, force may be applied via hydraulic fluid. The hydraulic system may include a shut off valve that supplies hydraulic fluid to the braking system generally. A servo valve, downstream of the shut off valve, may supply hydraulic fluid at other portions of the braking system.

Figure 1:
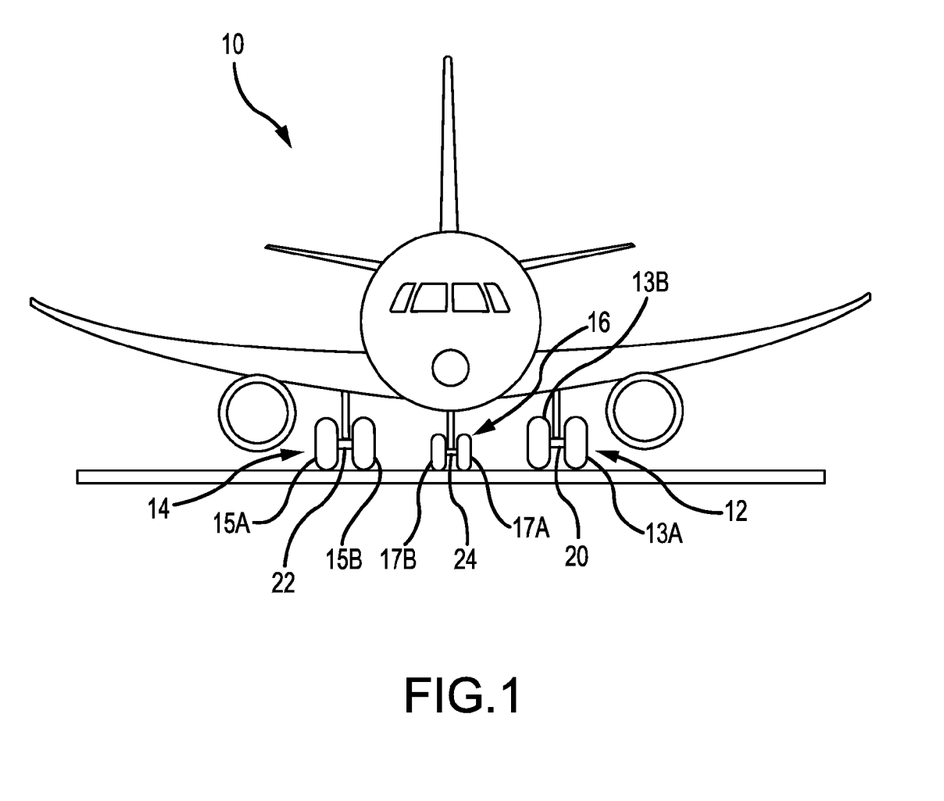
FIG. 1 illustrates an aircraft having landing gear, in accordance with various embodiments.

With reference to FIG. 1, an aircraft 10 in accordance with various embodiments may include landing gear such as landing gear 12, landing gear 14 and landing gear 16. Landing gear 12, landing gear 14 and landing gear 16 may generally support aircraft 10 when aircraft is not flying, allowing aircraft 10 to taxi, take off and land without damage. Landing gear 12 may include wheel 13A and wheel 13B coupled by a strut 20; landing gear 14 may include wheel 15A and wheel 15B coupled by a strut 22; and landing gear 16 may include nose wheel 17A and nose wheel 17B coupled by a strut 24. Wheel 13A and wheel 15A may be referred to as outboard wheels. Wheel 13B and wheel 15B may be referred to as inboard wheels. The nose wheels differ from the main wheels in that the nose wheels may not include a brake.

Figure 2:
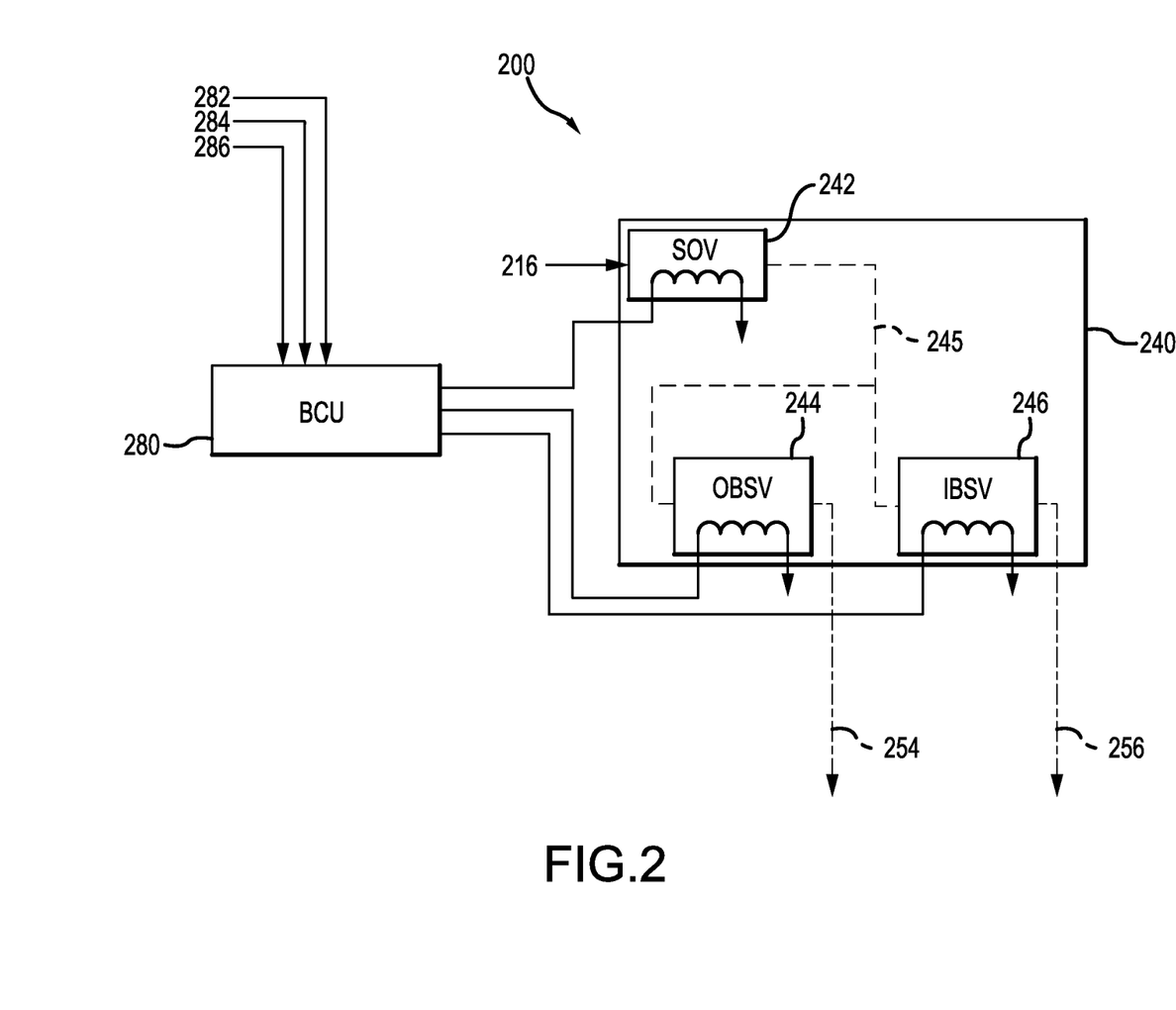
FIG. 2 illustrates a schematic view of a brake system for emergency and parking applications, in accordance with various embodiments.

With reference to FIG. 2, a brake system for emergency and parking applications (hereinafter "system 200") is illustrated. System 200 may include a module 240. Module 240 may be a brake control module (BCM). Module 240 may be in communication with shut off valve 242. SOV 242 may be supplied with pressurized hydraulic fluid via Park/Emergency Hydraulic Power A 216. Park/Emergency Hydraulic Power A 216 may supply pressurized hydraulic fluid to SOV 242. In various embodiments, Park/Emergency Hydraulic Power A 216 may supply brake fluid to SOV 242. In various embodiments, Park/Emergency Hydraulic Power A 216 may comprise a pressurized fluid system for use during parking and emergency braking. Shut off valve 242 may be coupled to outboard servo-valve (OBSV) 244 and inboard servo-valve (IBSV) 246 via fluid conduit 245. Shut off valve 242 may be configured to supply OBSV 244 and IBSV 246 with pressurized hydraulic fluid in response to being in the open position. OBSV 244 and IBSV 246 may be configured to meter hydraulic fluid pressure between shut off valve 242 and various other brake system components via fluid conduit 254 and fluid conduit 256 as further described herein.

In various embodiments, the valves as discussed herein may be replaced with various types of valves known to a person having ordinary skill in the art. In various embodiments, OBSV 244 may be replaced with a shut off valve or the like, for example. In various embodiments, IBSV 246 may be replaced with a shut off valve or the like. In various embodiments, OBSV 244 may be referred to generally as an outboard valve (OBV). In various embodiments, IBSV 246 may be referred to generally as an inboard valve (IBV).

System 200 may include brake controller 280. Brake controller 280 may be in electrical communication with module 240. In various embodiments, brake controller 280 may be a controller and/or processor. In various embodiments, brake controller 280 may be implemented in a single controller and/or processor. In various embodiments, brake controller 280 may be implemented in multiple controllers and/or processors. In various embodiments, brake controller 280 may be implemented in a brake control unit. In various embodiments, brake controller 280 may receive a first power signal 282. First power signal 282 may be a direct current (DC) power signal. First power signal 282 may comprise a magnitude of approximately twenty-eight volts (28 V). In various embodiments, brake controller 280 may receive a second power signal 284. Second power signal 284 may be similar to first power signal 282. In various embodiments, brake controller 280 may receive a vehicle management system (VMS) signal 286. In various embodiments, VMS signal 286 may comprise a computer controlled avionics signal. VMS signal 286 may be controlled by a vehicle management system or a computer controlled avionics system. A vehicle management system may be a system whereby a vehicle may be operated (e.g., take flight) and controlled remotely, without a human aboard the vehicle to operate the vehicle. For example, an aircraft may be controlled by an operator remotely without an operator being aboard the aircraft during operation. In various embodiments, a VMS may comprise a plurality of processors in order to separate the control of various components. For example, a VMS may include vehicle management system A (VMS-A) and vehicle management system B (VMS-B) each controlled by a separate processor of a VMS. VMS-A may be referred to as a first VMS and VMS-B may be referred to as a second VMS. In this regard, flight control signals may be redundant such that the risk of loss of control of the aircraft is mitigated.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. §101.

Figure 3:
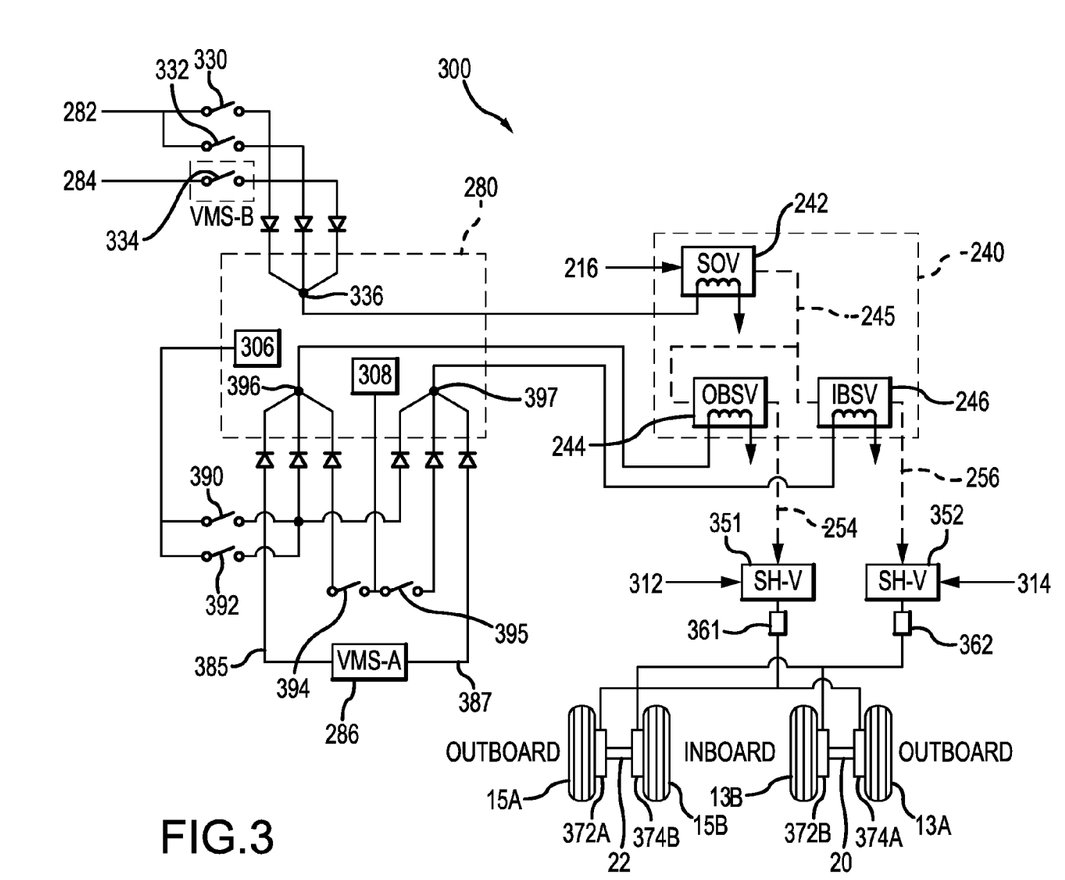
FIG. 3 illustrates a schematic view of a system for emergency and parking applications coupled to aircraft wheels and brakes, in accordance with various embodiments.

With reference to FIG. 3, elements with like element numbering as depicted in FIG. 2, are intended to be the same and will not necessarily be repeated for the sake of clarity.

FIG. 3 illustrates a system 300 for emergency and parking applications (hereinafter "system 300") according to various embodiments. System 300 may comprise brake controller 280. In various embodiments, brake controller 280 may be implemented in a machine-readable non-transitory medium and performed by a controller. In various embodiments, brake controller 280 may be implemented on a special use controller, field programmable gate array, or the like. In various embodiments, brake controller 280 may be implemented on one or more controllers. In various embodiments, brake controller 280 may comprise a brake controller unit (BCU).

In various embodiments, first power signal 282 may be in electronic communication with cockpit enable switch 330 and wheel well enable switch 332. Cockpit enable switch 330 may be located in the cockpit of an aircraft. In various embodiments, a pilot or operator of an aircraft may have access to cockpit enable switch 330. In various embodiments, wheel well enable switch 332 may be located in the wheel well of an aircraft, for example, in a nose landing gear wheel well. In various embodiments, ground crew or other personnel may be able to access wheel well enable switch 332 from the ground by reaching into the wheel well of the aircraft. Cockpit enable switch 330 may be in electronic communication with OR gate 336. A diode may be located between cockpit enable switch 330 and OR gate 336. Wheel well enable switch 332 may be in electronic communication with OR gate 336. A diode may be located between wheel well enable switch 332 and OR gate 336.

In various embodiments, second power signal 284 may be in electronic communication with vehicle management system B (VMS-B) enable switch 334. VMS-B enable switch 334 may be commanded by VMS-B signal 286. VMS-B enable switch 334 may be in electronic communication with OR gate 336. A diode may be located between VMS-B enable switch 334 and OR gate 336.

In various embodiments, OR gate 336 may be configured to transmit first power signal 282 or second power signal 284 to module 240. Module 240 may be configured to open shut off valve (SOV) 242 in response to receiving first power signal 282 or second power signal 284. For example, if cockpit enable switch 330 is closed, and wheel well enable switch 332 and VMS-B enable switch 334 are open, the signal from first power signal 282 may be sent to OR gate 336 and thereby be transmitted to SOV 242. In a further example, if all three of cockpit enable switch 330, wheel well enable switch 332, and VMS-B enable switch 334 are closed, first power signal 282 and second power signal 284 may be sent to OR gate 336, wherein OR gate 336 may be configured to transmit only one of first power signal 282 and second power signal 284 to SOV 242. In that regard, OR gate 336 may be configured to send at least one input of multiple inputs and, for example, may be configured to output the highest input signal or the lowest input signal.

In various embodiments, in response to one of first power signal 282 and second power signal 284 being sent to SOV 242, SOV 242 may be configured to open and supply outboard servo-valve (OBSV) 244 and inboard servo-valve (IBSV) 246 with pressurized fluid as previously described.

In various embodiments, brake controller 280 may include park value 306 and emergency value 308. In various embodiments, park value 306 and emergency value 308 may be predetermined set values and may be programmable in brake controller 280. In various embodiments, park value 306 may correspond to a desired force that may be applied to a brake system in response to an aircraft being in a parked position. In various embodiments, emergency value 308 may correspond to a desired force that may be applied to a brake system in an emergency situation. Park value 306 and emergency value 308 may comprise an electrical current value that may be measured in milliamps (mA).

In various embodiments, park value 306 may be in electronic communication with wheel well park switch 390 and park brakes switch 392. Wheel well park switch 390 may be located in the wheel well of an aircraft, such as in the nose landing gear wheel well of an aircraft, for example. Park brakes switch 392 may be located in the cockpit of an aircraft. Wheel well park switch 390 and park brakes switch 392 may be in electronic communication with first OR gate 396. Wheel well park switch 390 and park brakes switch 392 may be in electronic communication with second OR gate 397. First OR gate 396 may be in electronic communication with OBSV 244. Second OR gate 397 may be in electronic communication with IBSV 246.

In various embodiments, emergency value 308 may be in electronic communication with emergency activate switch 394. Emergency activate switch 395 may be in electronic communication with first OR gate 396. In various embodiments, emergency value 308 may be in electronic communication with emergency activate switch 395. Emergency activate switch 395 may be in electronic communication with second OR gate 397. Emergency activate switch 394 and emergency activate switch 395 may be located in the cockpit of an aircraft. In various embodiments, various switches may be located geographically close to one another. For example, wheel well enable switch 332 may be located in close proximity to wheel well park switch 390.

In various embodiments, vehicle management system (VMS) 286 may be in electronic communication with first OR gate 396 via vehicle management system A (VMS-A) signal 385. A diode may be located between VMS-A signal 385 and first OR gate 396. In various embodiments, VMS 286 may be in electronic communication with second OR gate 397 via VMS-A signal 387. A diode may be located between VMS-A signal 387 and second OR gate 397. VMS-A signal 385 and VMS-A signal 387 may be configured to send a value corresponding to an emergency braking operation. VMS-A signal 385 and VMS-A signal 387 may be configured to send a value corresponding to a park braking operation. In various embodiments, the value corresponding to a park braking operation may be larger in magnitude than the value corresponding to an emergency braking operation.

First OR gate 396 may be a priority OR gate. For example, first OR gate 396 may be configured to transmit the signal with the highest value. For example, if a signal of eighteen milliamps (18 mA) is sent to first OR gate 396 from emergency value 308 and a signal of 30 milliamps (30 mA) is being sent to first OR gate 396 from VMS-A signal 385, OR gate 396 may be configured to transmit the signal of 30 mA to OBSV 244. Second OR gate 397 may be similar to first OR gate 396.

OBSV 244 may be configured to meter fluid pressure between shut off valve 242 and outboard shuttle valve 351. IBSV 246 may be configured to meter fluid pressure between shut off valve 242 and inboard shuttle valve 352. OBSV 244 may be coupled to outboard shuttle valve 351 via fluid conduit 254. IBSV 246 may be coupled to inboard shuttle valve 352 via fluid conduit 256.

Inboard shuttle valve 352 and outboard shuttle valve 351 may receive pressurized fluid from various components. Outboard shuttle valve 351 may receive pressurized fluid from Primary Hydraulic Power A 312. Outboard shuttle valve 351 may receive pressurized fluid from OBSV 244. Inboard shuttle valve 352 may receive pressurized fluid from Primary Hydraulic Power B 314. Primary Hydraulic Power A 312 and Primary Hydraulic Power B 314 may comprise a braking system during normal operation such as deflection of a brake pedal in order to slow down an aircraft. Outboard shuttle valve 352 may receive pressurized fluid from IBSV 246. In various embodiments, outboard shuttle valve 351 and inboard shuttle valve 352 may be priority shuttle valves such that in response to receiving multiple inputs, the output comprises the highest pressure input. For example, if OBSV 244 is supplying outboard shuttle valve 351 with 3,000 psi of pressurized fluid and Primary Hydraulic Power A 312 is supplying outboard shuttle valve 351 with 1,500 psi of pressurized fluid, outboard shuttle valve 351 may be configured to supply outboard brakes 372A, 374A with 3,000 psi of pressurized fluid.

Outboard shuttle valve 351 may be coupled to outboard brakes 372A, 374A of an aircraft. Inboard shuttle valve 352 may be coupled to the inboard brakes 372B, 374B of an aircraft. A hydraulic fuse 362 may be located between inboard shuttle valve 352 and inboard brakes 372B, 374B. A hydraulic fuse 361 may be located between outboard shuttle valve 351 and outboard brakes 372A, 374A. A hydraulic fuse may be a component which prevents sudden loss of hydraulic fluid pressure. Inboard brakes 372B and inboard brakes 374B may be coupled to wheel 13B and wheel 15B, respectively. Outboard brakes 372A and outboard brakes 374A may be coupled to wheel 15A and wheel 13A, respectively. Outboard brakes 372A, 374A may be configured to be operated hydraulically in order to decrease the angular velocity of a wheel.

In an various embodiments, a vehicle operator may close the cockpit enable switch 330, which may open shut off valve (SOV) 242. When SOV 242 is in the open position, it may supply six thousand pounds per square inch (6,000 psi or 41,368.5 kPa) of pressurized fluid to OBSV 244 and IBSV 246. Park value 306 may comprise a signal corresponding to three thousand pounds per square inch (3,000 psi or 20,684.3 kPa) of pressure. If it is desired that 3,000 psi of pressure be applied to the brakes of an aircraft, an operator may close park brakes switch 392 which may send park value 306 to OBSV 244 and IBSV 246. OBSV 244 and IBSV 246 may be configured to input the 6,000 psi pressurized fluid and output 3,000 psi of pressurized fluid in a manner which is known to a person having ordinary skill in the art. The output of 3,000 psi of pressurized fluid from OBSV 244 and IBSV 246 may be supplied to outboard shuttle valve 351 and inboard shuttle valve 352 and ultimately to the inboard and outboard brakes of an aircraft. In the described example, Primary Hydraulic Power A 312 and Primary Hydraulic Power B 314 are both supplying less than 3,000 psi of fluid to outboard shuttle valve 351 and inboard shuttle valve 352, respectively. In this manner, brake controller 280 requires two separate commands by two separate intelligent systems in order to enable vehicle braking, namely an enable command which supplies pressure to OBSV 244 and IBSV 246 and an activate command which opens at least one of OBSV 244 and IBSV 246.

Figure 4:
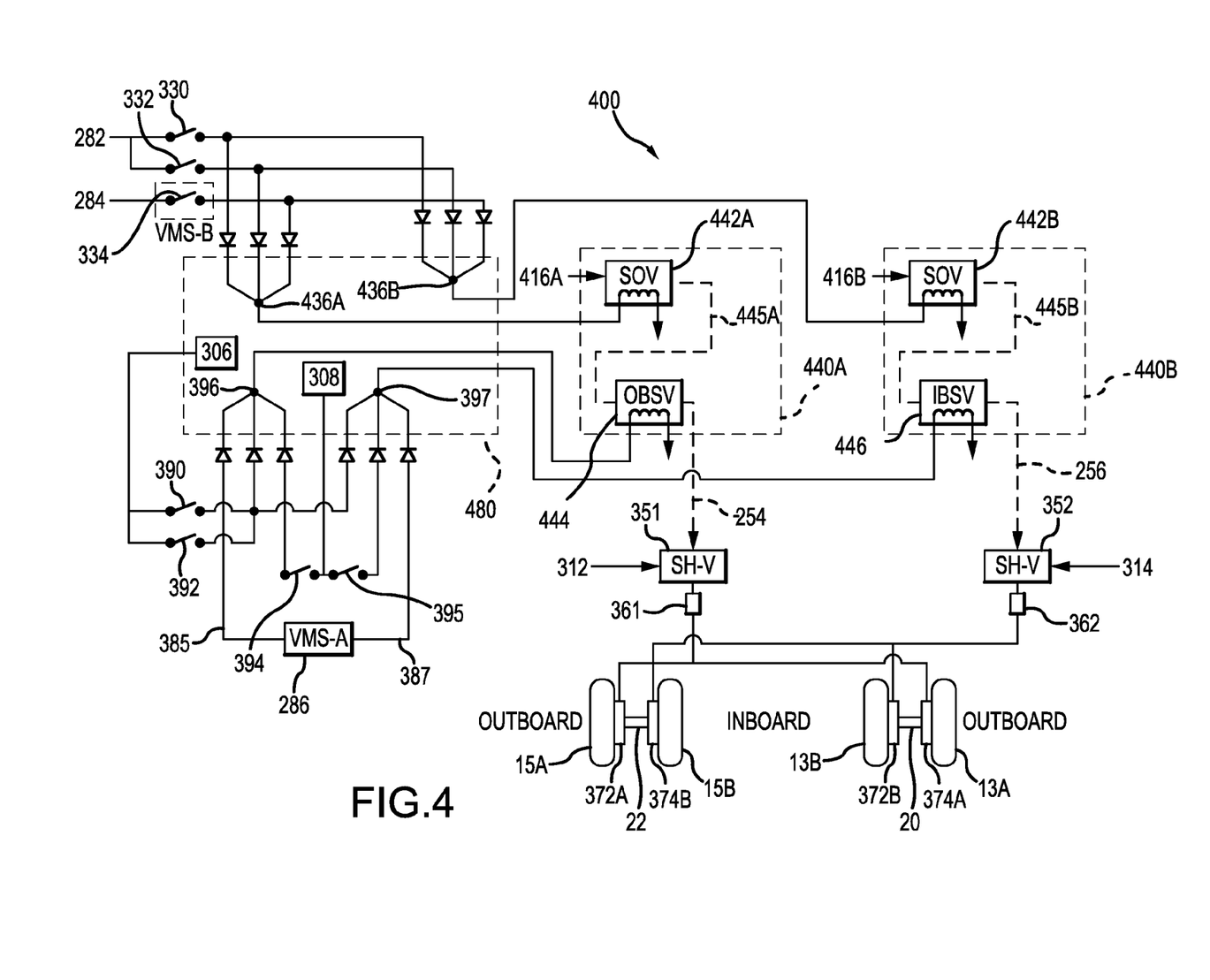
FIG. 4 illustrates a schematic view of a system for emergency and parking applications with emergency/parking power source redundancy, in accordance with various embodiments.

With reference to FIG. 4, elements with like element numbering as depicted in FIG. 3, are intended to be the same and will not necessarily be repeated for the sake of clarity.

FIG. 4 illustrates a system 400 for emergency and parking applications (hereinafter "system 400") with emergency/parking power source redundancy. System 400 may comprise a controller 480. Controller 480 may be similar to brake controller 280. System 400 may include OR gate 436A. OR gate 436A may be similar to OR gate 336 of FIG. 3. Or gate 436A may be in electronic communication with shut off valve (SOV) 442A. System 400 may include OR gate 436B. OR gate 436B may be similar to OR gate 336 of FIG. 3. OR gate 436B may be in electronic communication with SOV 442B. System 400 may comprise a plurality of modules. System 400 may comprise module 440A and module 440B. Module 440A may be referred to as a first module. Module 440B may be referred to as a second module. Module 440A may comprise SOV 442A. SOV 442A may be similar to SOV 242 of FIG. 3. SOV 442A may be coupled to outboard servo-valve (OBSV) 444 via fluid conduit 445A. Module 440B may comprise SOV 442B. SOV 442B may be similar to SOV 242 of FIG. 3. SOV 442B may be coupled to inboard servo-valve (IBSV) 446 via fluid conduit 445B. OBSV 444 may be similar to OBSV 244 of FIG. 3. IBSV 446 may be similar to IBSV 246 of FIG. 3.

System 400 may comprise Park/Emergency Hydraulic Power A 416A. Park/Emergency Hydraulic Power A 416A may be similar to Park/Emergency Hydraulic Power A 316 of FIG. 3. Park/Emergency Hydraulic Power A 416A may be coupled to SOV 442A. System 400 may comprise Park/Emergency Hydraulic Power B 416B. Park/Emergency Hydraulic Power B 416B may be similar to Park/Emergency Hydraulic Power A 316 of FIG. 3. Park/Emergency Hydraulic Power B 416B may be coupled to SOV 442B. Accordingly, system 400 may comprise hydraulic power source redundancy. Therefore, in the event that one power source fails, the other power source will still be able to supply hydraulic or pneumatic pressure to the brakes of an aircraft.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant arts) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A brake system, comprising:
   a controller;
   a vehicle management system (VMS), wherein the VMS is in communication with the controller;
   a shut-off valve (SOV), in communication with the controller;
   an outboard valve (OBV), in communication with the controller and in fluid communication with the SOV;

an inboard valve (IBV), in communication with the controller and in fluid communication with the SOV;
a control module, wherein the control module is in communication with at least one of the SOV, OBV, and IBV;
an emergency/park power source, wherein the emergency/park power source is in fluid communication with the SOV;
a tangible, non-transitory memory configured to communicate with the controller, the tangible, non-transitory memory having instructions stored thereon that, in response to execution by the controller, cause the controller to perform operations comprising:
sending, by the controller, at least one of a first power signal and a second power signal to the SOV, wherein in response to at least one of the first power signal or second power signal, the SOV is configured to open;
sending, by the controller, a largest of a plurality of signals to the OBV, wherein the plurality of signals comprise at least one of a VMS signal, a park value, and an emergency value, wherein in response to the largest signal being sent to the OBV, the OBV is configured to at least partially open; and
sending, by the controller, the largest of a plurality of signals to the IBV, wherein the plurality of signals comprise at least one of the VMS signal, the park value, and the emergency value, wherein in response to the largest signal being sent to the IBV, the IBV is configured to at least partially open.

2. The brake system of claim 1, wherein the brake system further comprises a plurality of switches in communication with the controller, wherein the plurality of switches comprise at least one of a cockpit enable switch, a wheel well enable switch, a VMS enable switch, a wheel well park switch, a park brakes switch, or an emergency activate switch.

3. The brake system of claim 2, wherein the SOV is configured to open in response to at least one of the cockpit enable switch, the wheel well enable switch, or the VMS enable switch being switched on.

4. The brake system of claim 1, wherein the IBV and the OBV are configured to meter the flow of a fluid supplied by the SOV according to at least one of the park value, the emergency value, or the VMS signal.

5. The brake system of claim 1, wherein the OBV is in fluid communication with a first shuttle valve and the IBV is in fluid communication a second shuttle valve.

6. The brake system of claim 5, wherein the brake system further comprises a first primary braking system in fluid communication with the first shuttle valve and a second primary braking system in fluid communication with the second shuttle valve.

7. The brake system of claim 6, wherein the first shuttle valve and the second shuttle valve are configured to meter the flow of a plurality of fluids according to the pressure of the plurality of fluids.

8. The brake system of claim 5, wherein the first shuttle valve and the second shuttle valve are in fluid communication with brakes of an aircraft, wherein the brakes are configured to apply mechanical pressure in response to fluidic pressure being applied to the brakes in order to reduce an angular velocity of a wheel on the aircraft.

9. The brake system of claim 8, wherein a first hydraulic fuse is located between the first shuttle valve and a brake of the aircraft and a second hydraulic fuse is located between the second shuttle valve and a brake of the aircraft.

10. A redundant emergency/park power source brake system, comprising:
a controller;
a vehicle management system (VMS), wherein the VMS is in communication with the controller;
a first shut-off valve (SOV), in communication with the controller;
a second shut-off valve (SOV), in communication with the controller;
an outboard valve (OBV), in communication with the controller and in fluid communication with the first SOV;
an inboard valve (IBV), in communication with the controller and in fluid communication with the second SOV;
a first control module, wherein the control module is in communication with the first SOV and the OBV;
a second control module, wherein the control module is in communication with the second SOV and the IBV;
a first emergency/park power source, wherein the first emergency/park power source is in fluid communication with the first SOV;
a second emergency/park power source, wherein the second emergency/park power source is in fluid communication with the second SOV;
a tangible, non-transitory memory configured to communicate with the controller, the tangible, non-transitory memory having instructions stored thereon that, in response to execution by the controller, cause the controller to perform operations comprising:
sending, by the controller, at least one of a first power signal and a second power signal to the first SOV and the second SOV, wherein response to one of the first power signal or second power signal being sent to the first SOV and the second SOV, the first SOV and the second SOV are configured to open;
sending, by the controller, a largest of a plurality of signals to the OBV, wherein the plurality of signals comprise at least one of a VMS signal, a park value, and an emergency value, wherein in response to the largest signal being sent to the OBV, the OBV is configured to at least partially open; and
sending, by the controller, the largest of a plurality of signals to the IBV, wherein the plurality of signals comprise at least one of the VMS signal, the park value, and the emergency value, wherein in response to the largest signal being sent to the IBV, the IBV is configured to at least partially open.

11. The redundant emergency/park power source brake system of claim 10, wherein the brake system further comprises a plurality of switches in communication with the controller, wherein the plurality of switches comprise at least one of a cockpit enable switch, a wheel well enable switch, a VMS enable switch, a wheel well park switch, a park brakes switch, or an emergency activate switch, wherein the first SOV and the second SOV are configured to open in response to one of the cockpit enable switch, wheel well enable switch, and/or VMS enable switch being switched on, wherein in response to the opening, pressurized fluid is supplied to the OBV and the IBV.

12. The redundant emergency/park power source brake system of claim 10, wherein the IBV and the OBV are configured to meter the flow of a fluid supplied by the SOV according to one of the park value, the emergency value, or the VMS signal.

13. The redundant emergency/park power source brake system of claim 10, wherein the OBV and the IBV are in fluid communication with a first shuttle valve and a second shuttle valve, respectively.

14. The redundant emergency/park power source brake system of claim 13, wherein the brake system further comprises a first primary braking system in fluid communication with the first shuttle valve and a second primary braking system in fluid communication with the second shuttle valve.

15. The redundant emergency/park power source brake system of claim 14, wherein the first shuttle valve and the second shuttle valve are configured to meter the flow of a plurality of fluids according to the pressure of the plurality of fluids, wherein the first shuttle valve and the second shuttle valve are in fluid communication with brakes of an aircraft, wherein the brakes are configured to apply mechanical pressure in response to fluidic pressure being applied to the brakes in order to reduce an angular velocity of a wheel on the aircraft.

16. A tangible, non-transitory memory configured to communicate with a controller, the tangible, non-transitory memory having instructions stored thereon that, in response to execution by the controller, cause the controller to perform operations comprising:
sending, by the controller, at least one of a first power signal and a second power signal to a shut-off valve (SOV), wherein in response to at least one of the first power signal or second power signal, the SOV is configured to open;
sending, by the controller, a largest of a plurality of signals to an outboard valve (OBV), wherein the plurality of signals comprise at least one of a VMS signal, a park value, and an emergency value, wherein in response to the largest signal being sent to the OBV, the OBV is configured to at least partially open; and
sending, by the controller, the largest of a plurality of signals to an inboard valve (IBV), wherein the plurality of signals comprise at least one of the VMS signal, the park value, and the emergency value, wherein in response to the largest signal being sent to the IBV, the IBV is configured to at least partially open.

17. The tangible, non-transitory memory of claim 16, wherein a plurality of switches are in communication with the controller, wherein the plurality of switches comprise at least one of a cockpit enable switch, a wheel well enable switch, a VMS enable switch, a wheel well park switch, a park brakes switch, or an emergency activate switch.

18. The tangible, non-transitory memory of claim 17, wherein the SOV is configured to open in response to at least one of the cockpit enable switch, the wheel well enable switch, or the VMS enable switch being switched on.

19. The tangible, non-transitory memory of claim 16, wherein the IBV and the OBV are configured to meter the flow of a fluid supplied by the SOV according to at least one of the park value, the emergency value, or the VMS signal.

20. The tangible, non-transitory memory of claim 16, wherein the OBV is in fluid communication with a first shuttle valve and the IBV is in fluid communication a second shuttle valve, wherein the first shuttle valve and the second shuttle valve are in fluid communication with brakes of an aircraft, wherein the brakes are configured to apply mechanical pressure in response to fluidic pressure being applied to the brakes in order to reduce an angular velocity of a wheel on the aircraft.

* * * * *